(12) United States Patent
Pinnell

(10) Patent No.: US 7,606,770 B2
(45) Date of Patent: *Oct. 20, 2009

(54) SYSTEM AND METHOD FOR PERFORMING AN ON-LINE TRANSACTION USING A SINGLE-USE PAYMENT INSTRUMENT

(75) Inventor: Nigel Pinnell, Santa Monica, CA (US)

(73) Assignee: Citicorp Development Center, Inc., Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/153,876

(22) Filed: May 27, 2008

(65) Prior Publication Data

US 2008/0243689 A1    Oct. 2, 2008

Related U.S. Application Data

(63) Continuation of application No. 09/641,896, filed on Aug. 18, 2000, now Pat. No. 7,398,253.

(60) Provisional application No. 60/149,874, filed on Aug. 19, 1999.

(51) Int. Cl.
*G06Q 99/00* (2006.01)
(52) U.S. Cl. .............. 705/66; 705/64; 705/65; 705/40; 713/150
(58) Field of Classification Search ............ 705/64–79, 705/35–44; 713/150
See application file for complete search history.

(56) References Cited

U.S. PATENT DOCUMENTS 5,010,485 A    4/1991    Bigari ................ 364/408
5,283,829 A    2/1994    Anderson ............. 380/24
5,570,465 A    10/1996    Tsakanikas ........... 395/1.15

(Continued)

FOREIGN PATENT DOCUMENTS

EP    0 485 090    5/1992

(Continued)

OTHER PUBLICATIONS

European Search Report for Application No. 00 20 2812, dated Apr. 29, 2005.

(Continued)

*Primary Examiner*—Jalatee Worjloh
(74) *Attorney, Agent, or Firm*—George T. Marcou; King & Spalding LLP

(57) ABSTRACT

A system and method for performing an on-line transaction, such as making a payment, with a single-use payment instrument makes use of computer hardware and software, such as the computing device of a customer, the customer's bank's home banking server, the bank's card authorization server, a vendor's website server, and the vendor's credit card acquirer, coupled to one another over a network. The customer is issued a single use payment instrument through the bank, the bank debits an account nominated by the customer for the requested value of the payment instrument and may also specify an expiry for the payment instrument. The customer is able to nominate a particular source of funds for each transaction from among various accounts of the customer. The payment instrument settles and clears through existing credit card payment mechanisms without a need for special accommodation with the Internet vendor.

19 Claims, 3 Drawing Sheets

U.S. PATENT DOCUMENTS

| | | | |
|---|---|---|---|
| 5,659,616 A | 8/1997 | Sudia | 380/23 |
| 5,757,917 A | 5/1998 | Rose et al. | 380/25 |
| 5,822,737 A | 10/1998 | Ogram | 705/26 |
| 5,826,241 A | 10/1998 | Stein et al. | 705/26 |
| 5,832,089 A | 11/1998 | Kravitz et al. | 380/24 |
| 5,883,810 A | 3/1999 | Franklin et al. | 700/232 |
| 5,915,023 A | 6/1999 | Bernstein | 380/24 |
| 5,949,044 A | 9/1999 | Walker et al. | 235/379 |
| 5,991,413 A | 11/1999 | Arditti et al. | 380/25 |
| 6,014,646 A | 1/2000 | Vallee et al. | 705/39 |
| 6,047,268 A | 4/2000 | Bartoli et al. | 705/35 |
| 6,073,839 A | 6/2000 | Mori et al. | 235/380 |
| 6,226,624 B1 | 5/2001 | Watson et al. | 705/44 |
| 6,247,047 B1 | 6/2001 | Wolff | 709/219 |
| 6,282,523 B1 | 8/2001 | Tedesco et al. | 705/45 |
| 6,327,578 B1 | 12/2001 | Linehan | 705/65 |
| 6,330,575 B1 | 12/2001 | Moore et al. | 707/234 |

FOREIGN PATENT DOCUMENTS

| | | |
|---|---|---|
| EP | 0 899 925 | 3/1999 |
| EP | 0 590 861 | 1/2001 |
| GB | 2 333 878 | 4/1999 |
| GB | 2 331 822 | 6/1999 |
| WO | WO 95/26536 | 10/1995 |
| WO | WO 98/30985 | 7/1998 |
| WO | WO 99/49424 | 9/1999 |

OTHER PUBLICATIONS

"The Bank Credit Card Business," $2^{nd}$ Edition.
Web Page entitled "American Express-Private Payments," Copyright 2000, Printed Jan. 17, 2001.
Orbiscom, "Pioneering New Era for Payment Security on the Web," Apr. 19, 2000.
Cozzi, Robert Jr., "Embedded SQL in RPG," Feb. 1989.

SYSTEM AND METHOD FOR PERFORMING AN ON-LINE TRANSACTION USING A SINGLE-USE PAYMENT INSTRUMENT

PRIORITY APPLICATION

This application is a continuation of co-pending U.S. patent application Ser. No. 09/641,896 filed Aug. 18, 2000, now U.S. Pat. No. 7,398,253, entitled "System and Method for Performing an On-Line Transaction Using a Single-Use Payment Instrument", claiming priority to U.S. Provisional Application No. 60/149,874 filed Aug. 19, 1999, each of which is incorporated herein by this reference.

FIELD OF THE INVENTION

The present invention relates generally to the field of electronic commerce and more particularly to a system and method for performing an on-line transaction, such as making a payment, with a single-use payment instrument.

BACKGROUND OF THE INVENTION

Currently, there is an element of customer uncertainty in making payments to merchants on the Internet. It is not always clear to an end user whether the customer's connection is secure. Further, the customer relies very much on visual means conveyed by the web browser that the customer is using and on pages of information that confirm certificate numbers that are used for encryption. Neither is it always clear to the customer whether that information is indeed accurate or correct or actually coming from the browser or from somebody who is trying to trick the customer.

Aside from Internet communication security, there is also the concern that the website with which the customer is communicating is not, in fact, who it purports to be. The customer may not even be aware of the entity with which the customer is dealing. For example, the customer finds a site where the customer wants to buy something, but the customer is not sure whether it is a merchant of whom the customer has heard. The customer is not sure whether the merchant is actually valid and above-board.

In any event, there is a perceived risk to the customer in using credit card information to pay for goods and services over the Internet. The customer's credit card information is of some value and can cause a financial loss as well as considerable inconvenience to the customer if it is captured by a third party with ill intentions.

On the merchant's side of the transaction, there is a real financial risk that if a credit card is used fraudulently, settlement may be withheld or revoked by the card issuer upon receipt of a customer dispute. As more goods, such as software, music, electronic books, and the like are purchased over the Internet with no physical delivery and hence no address involved, the opportunities for such fraud increase.

SUMMARY OF THE INVENTION

It is a feature and advantage of the present invention to provide a system and method for performing an on-line transaction that enables an Internet customer, such as an Internet customer making a purchase, to pay for goods and/or services on the web without having to worry about the customer's credit card information getting into the wrong hands.

It is another feature and advantage of the present invention to provide a system and method for performing an on-line transaction that provides a user, such as an Internet purchaser, with a unique payment token to pay for goods and/or services on the web but which is useless to any unauthorized person.

It is an additional feature and advantage of the present invention to provide a system and method for performing an on-line transaction with a single-use payment instrument that affords the customer all the protection available to the customer when the customer makes use of a credit card or debit card.

It is a further feature and advantage of the present invention to provide a system and method for performing an on-line transaction with a single-use payment instrument that removes any concern of the customer about security of the customer's connection or the integrity of the website with which the customer makes the transaction.

It is a further feature and advantage of the present invention to provide a system and method for performing an online transaction that allows merchants the option to identify the token as a single-use instrument based on a characteristic range of numbers and either offer preferential terms on such transactions or impose limits or referrals on those who do not use such an instrument.

To achieve the stated and other features, advantages and objects, an embodiment of the present invention provides a customer, such as an Internet purchaser, a one-off, single-use payment token or instrument that will still settle and clear through existing credit card payment mechanisms. There is no need for special accommodation with the Internet vendor in order for the customer to take advantage of this instrument. Any vendor that is set up to accept credit card transactions by the input of a credit card number and a card expiration date can also be provided with the one-off payment instrument for an embodiment of the present invention, that would then, as far as that vendor is concerned, settle through the usual credit card channels. The card expiration date is the month/year card expiration date which a customer must provide in a standard credit card transaction. An embodiment of the present invention utilizes a card expiration date which is fabricated, because there is no real card involved.

An embodiment of the present invention makes use of computer hardware and software, such as the computing device of a customer, which can be the customer's personal computer (PC), the customer's bank's home banking server, the bank's card authorization server, a vendor's website server, and the vendor's credit card acquirer, coupled to one another over a network, which can be a global network, such as the Internet. The system and method for an embodiment of the present invention enables the customer to perform an on-line transaction with a vendor using the single-use payment instrument, for example, by entering details of the on-line transaction at the customer's PC coupled to the customer's bank's home banking server over the network. The transaction details include, for example, a payment amount for the transaction, which is received by the home banking server from the computing device of the customer over the network.

In an embodiment of the present invention, upon receiving the details for the on-line transaction with the vendor from the customer, the customer is prompted by the home banking server to enter a selection for a source of funds for the transaction from a plurality of nomination options, such as a credit card account, a checking account, or a savings account. The home banking server receives the customer's nomination of the source of funds for the transaction from the customer's computing device over the network. The home banking server verifies an availability of funds for the payment amount for the transaction in the nominated source of funds and reserves funds sufficient for the payment amount in the nominated source of funds. In an aspect of an embodiment of the present invention, the funds can be reserved for a predetermined expiry period. The predetermined expiry period, as distinguished from the fabricated card expiration date, is typically a short period of hours or days for which the payment instrument is valid, but it is not provided to the customer to use in the transaction.

In addition, in an embodiment of the present invention, the home banking server generates details of a payment instrument for the transaction corresponding to the transaction details, such as the payment amount for the transaction and a unique identification number for the transaction. Further, the transaction details generated by the home banking server can include a predetermined expiry for the payment instrument. In addition, the identification number can have an embedded bank identification number for routing the request for authorization to an appropriate authorization server, and the identification number can be generated from a characteristic range of numbers identifiable by a web site server of the vendor as offering superior authentication. A record of the payment instrument details is stored by the home banking server in a database of one or both of the home banking server and a credit card authorization server of the bank. The home banking server also provides the payment instrument details to the customer at the customer's computing device over the network for use by the customer in the transaction with the vendor.

In an embodiment of the present invention, the customer at the customer's computing device sends the payment instrument details over the network to the vendor's website server to pay for the transaction with the vendor. The vendor's website server presents the payment instrument details to the vendor's credit card acquirer service. In turn, the vendor's credit card acquirer service presents the payment instrument details to the bank's credit card authorization server for authorization. Upon receiving the request for authorization of the transaction for the customer by the bank's credit card authorization server, if the request for authorization according to the payment instrument details corresponds to the stored record of the payment instrument details, the authorization server sends an authorization for the transaction for the customer via the vendor's credit card acquirer service to the vendor's website server.

If the payment instrument details for an embodiment of the present invention include the predetermined expiry for the payment instrument, the transaction is authorized by the credit card authorization server if the request for authorization is received within the predetermined expiry of the payment instrument. The banking server also debits the nominated source of funds for the payment amount and removes the stored record of the payment. Thus, an embodiment of the present invention provides a method and system by which an Internet customer is issued a one-off, single use payment token or instrument, through a bank with whom he or she maintains a checking or credit account. The bank debits the customer's checking or credit card account for the requested value of the token or instrument which depends on the cost of the product or service which is the subject of a proposed transaction. The bank may also specify a transaction period during which the token or instrument is valid and not valid at any other times.

The single-use payment token or instrument for an embodiment of the present invention is distinguished from a debit or credit card-like instrument in that the customer is able to choose the source of the money for each transaction from among various accounts of the customer. Thus, the customer is able to nominate a particular source of funds for a particular transaction, the nominated source is checked for availability of credit or funds, and the funds are earmarked to be reserved for the same period as the expiry of the token or instrument. There is no need for special accommodation with Internet vendors in order for customers to take advantage of the instrument. Any vendor that is set up to accept credit card transactions by the input of a credit card number and a card expiration date can also be provided with the one-off payment instrument, that would then, as far as that vendor is concerned, settle through the usual credit card channels.

Additional objects, advantages and novel features of the invention will be set forth in the description which follows, and in part will become more apparent to those skilled in the art upon examination of the following, or may be learned by practice of the invention.

DETAILED DESCRIPTION

Figure 1:
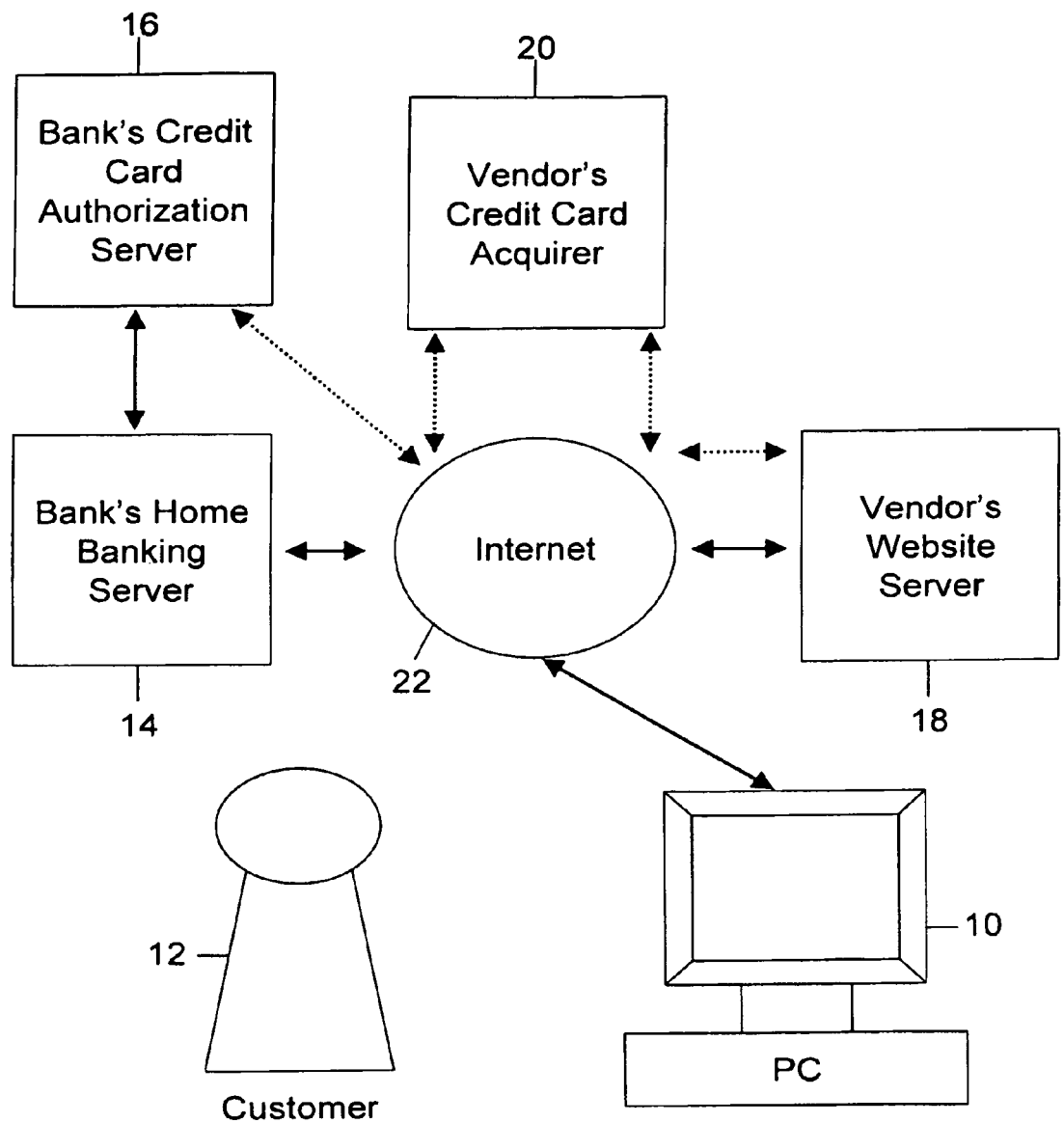
FIG. 1 is a schematic diagram which illustrates an example overview of key components and the flow of information between the key components for an embodiment of the present invention.

Referring now in detail to an embodiment of the present invention, an example of which is illustrated in the accompanying attachments, FIG. 1 is a schematic diagram which illustrates an example overview of key components and the flow of information between the key components for an embodiment of the present invention. Referring to FIG. 1, an embodiment of the present invention involves a number of computer hardware and software components, such as the computing device 10 of a customer 12, the customer's bank's home banking server 14, the bank's card authorization server 16, a vendor's website server 18, and the vendor's credit card acquirer 20, coupled to one another over a network, such as the Internet 22.

The system and method for an embodiment of the present invention enables the customer 12 to make a payment token good only for a single Internet transaction. In order to do that, before the customer 12 makes a purchase, the customer 12 signs on to the customer's preferred home banking system 14, such as Citibank's DIRECT ACCESS system, using the customer's personal computer (PC) 10. The customer 12 signs on to the home banking system 14 in exactly the same way in which the customer 12 normally accesses the home banking system 14 over the Internet 22.

In an embodiment of the present invention, the customer 12 signs on to the home banking system 14, and fills in a very brief couple of fields of information explaining the transaction and, most importantly, the amount, in response to prompts by the system 14 for the information. The system for an embodiment of the present invention includes, for example, application software that then creates a temporary credit card number and expiry date. The expiry date is the one other piece of information that is known to be submitted in the typical credit card authorization. The system for an embodiment of the present invention makes a unique combination of a card number and expiry date and provides that to the customer 12 for use for the purchase, for example, via the vendor's website server 18.

The system software for an embodiment of the present invention then creates the necessary record for the particular transaction to be authorized. However, unlike a normal credit card where any valid transaction subject to balance verification can be authorized, an embodiment of the present invention creates a single-use payment instrument which exists only for the duration of, and specifically for, that single transaction. Therefore, any other authorization request which comes into the system with those details for a different amount are rejected. The customer 12 then proceeds back to (or to) the vendor's Internet website 18 and enters that information just as the customer 12 would enter a credit card number and its expiry date at whatever point that the vendor's system 18 asks for the customer's credit card information.

In an embodiment of the present invention, once the particular transaction item has been approved for the amount of which the customer 12 advised the vendor's website server 18 and the bank's home banking server 14, it too is removed from any authority, so it would only work once. The result of that is that anyone else who may come into possession of that particular piece of information will not be successful if they attempt to use it to perform any other transaction whatsoever. Accordingly, if the vendor to whose website server 18 the customer's PC 10 is connected is actually acting criminally and is only gathering the information to try and use it elsewhere, while it will work for the transaction about which the customer 12 gave information to the customer's bank's home banking server 14, it cannot be subsequently authorized. It essentially represents a non-existent bank card, and it is of no use to anyone else.

The system and method for an embodiment of the present invention protects both the bank, as well as the customer 12, from anyone taking that information while it is in transit, encryption discussions notwithstanding, or while it is stored on the vendor's computer system 18 and using it for fraudulent purposes. The vendor benefits from being able to transact with a wider base of confident customers. And, if the vendor chooses to do so, the vendor's website server 18 can be configured to recognize the type of instrument being used by characteristic range of numbers and permit more preferential terms higher value transactions for such payments on the basis of their superior authenticity. The customer does not have to be concerned that the Internet connection is secure. All that the customer 12 has provided to the bank is the customer's identification to the bank's home banking system 14, but that information is of no use to anyone else who attempts to present it to a merchant. In other words, the only item of information being transferred across the network 22 is the temporary, short-lived, single-use payment instrument that is created.

An additional aspect of an embodiment of the present invention is that the application of the bank's home banking server 14 that creates the token is able to access the database of the bank's credit card authorization server 16 used for credit card authorization on-line. That application creates the necessary records for the single-use, temporary payment instrument, examines incoming authorization requests for that particular instrument from the vendor's credit card acquirer 20, verifies that the amount corresponds with the transaction of which the customer 12 advised the bank, and authorizes the appropriate transaction, while rejecting any others. In addition, the application also cleans up that database and removes records referring to that instrument once the transaction has been concluded or has expired, as it is not a real credit card, and is also subject to a predetermined expiry. In other words, the customer 12 is told that this payment authorization token can be used for a predetermined period of time, after which it will become useless in and of itself, and the customer 12 will have to come and get another one.

In terms of financial settlement from that point on, in an embodiment of the present invention, the customer 12 is debited through whatever mechanism the customer 12 chooses. For example, the bank can take the money from a credit card or from a checking account or from some other account designated by the customer 12. The vendor, assuming that the vendor is indeed valid, can present that transaction just as it would any other credit card transaction, and it is settled through the normal channels. Thus, there is no actual sign-up necessary for the customer 12. The customer 12 merely needs to identify himself or herself to the bank's home banking server 14, in order to authorize the issuance of the transaction token and to authorize the bank to debit the customer's account.

In an embodiment of the present invention, the bank knows which account of the customer 12 to debit by the customer 12 providing that information when the customer 12 requests the token. Alternatively, the bank can default to the customer's main transactional account that is associated with the profile under which the customer 12 logged on to the home banking system 14. However, it is likely to be more convenient for the customer 12 to be able to choose from where to get the money. In that sense, the single-use payment instrument is not necessarily characterized as a debit card-like instrument or a credit card-like instrument.

In an embodiment of the present invention, the way in which the home banking system 14 works is that one or more customer accounts, such as credit card accounts, checking accounts, and savings accounts, are linked to the customer's profile. Thus, the customer 12 is able to nominate a particular source for the funds for a transaction or set a preference for the bank to default to a particular means to save the customer 12 from entering it each time. In addition, since this is an on-line system capable of doing so, the customer's nominated source of funds is checked, as is the case with someone presenting a debit card or credit card, and the funds are earmarked to be reserved for the same period of time as the expiry of the token.

Referring again to FIG. 1, in an embodiment of the present invention, the customer 12 at the customer's PC 10 accesses the vendor's website server 18 and the bank's home banking server 14 over the Internet 22. In turn, the bank's home banking server 14 is coupled to the credit card authorization server 16, which is updated with the one-off occurrence for an embodiment of the present invention. The application for an embodiment of the present invention resides, for example, on the home banking server 14 and the credit card authorization server 16. Graphical user interface (GUI) screens are presented for the customer 12 on the customer's PC 10 through the customer's browser.

Figure 2:
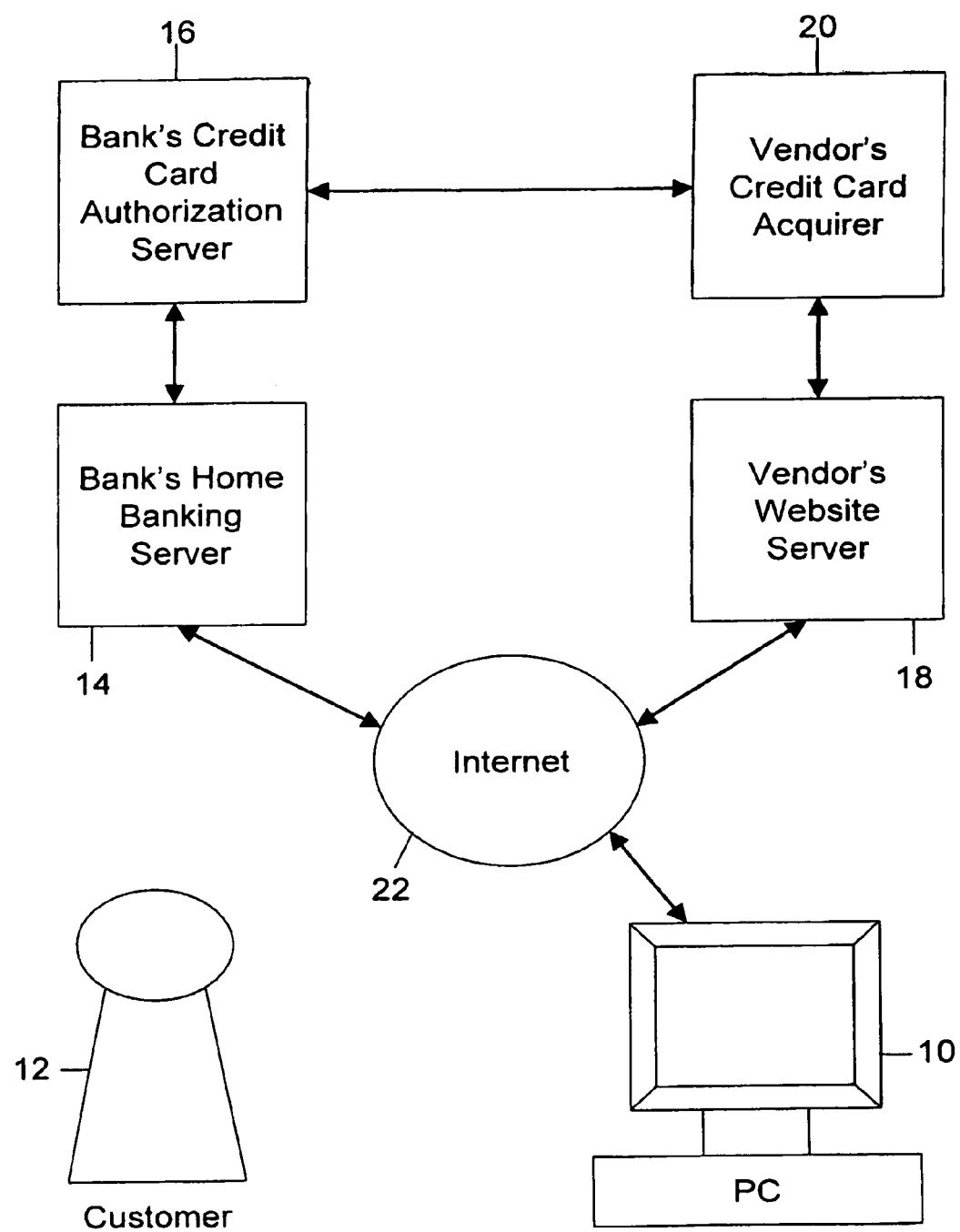
FIG. 2 is a schematic diagram which illustrates an example overview of key components and the flow of information between the key components for an alternate embodiment of the present invention.

FIG. 2 is a schematic diagram which illustrates an example overview of key components and the flow of information between the key components for an alternate embodiment of the present invention. Referring to FIG. 2, the arrangement is similar to that illustrated in FIG. 1 except, for example, not using the Internet 22, the vendor's website server 18 itself connects to the vendor's credit card acquirer service provider 20 which, in turn, queries the authorization system 16 back on the bank's side via private networks or leased lines. Thus, as far as the customer 12 is concerned, the customer 12 communicates strictly with the website server 18, and the website server 18 uses whatever means it currently has to authorize the credit card transaction, which may or may not involve further communication over the Internet 22.

Figure 3:
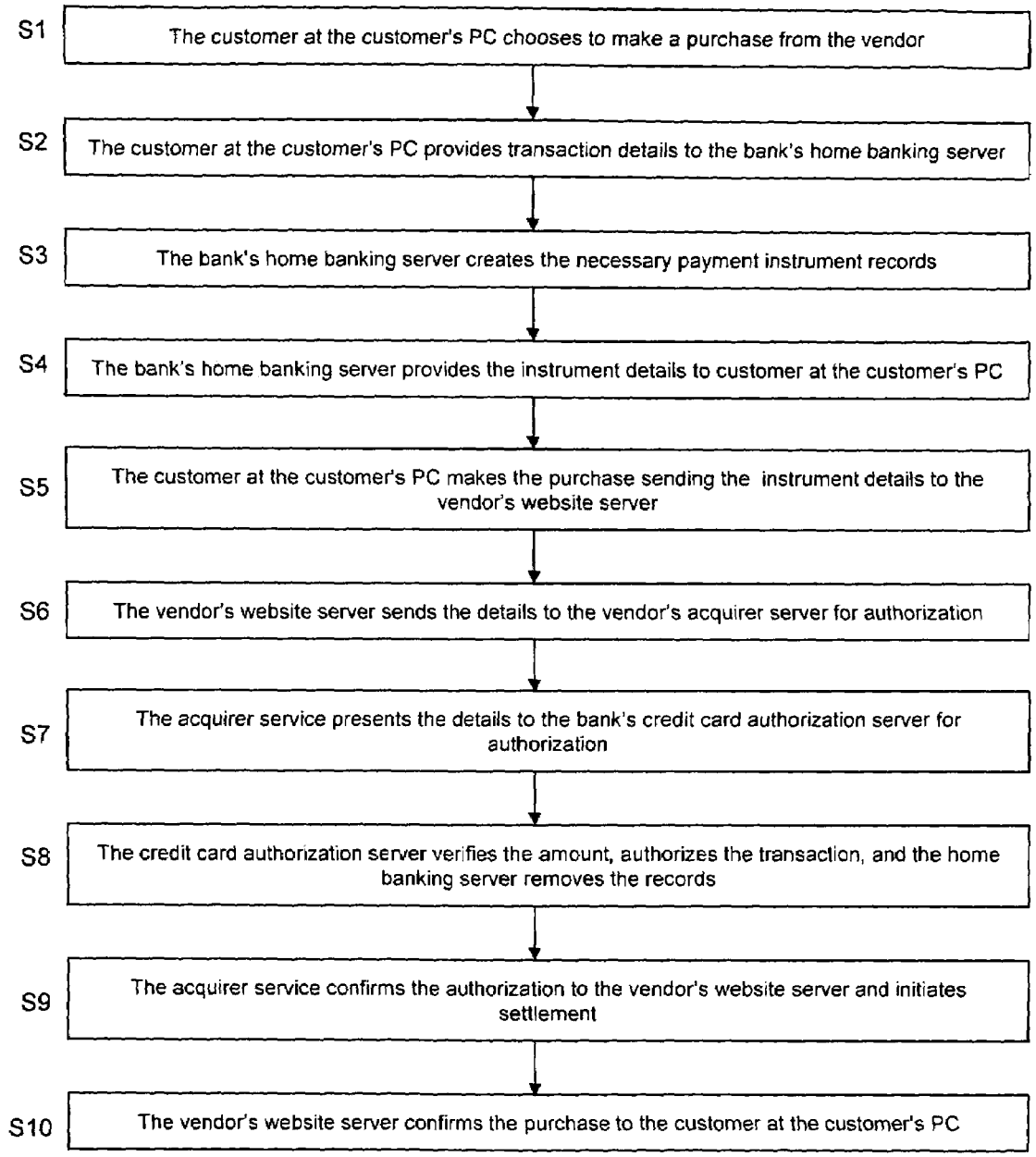
FIG. 3 is a flow chart which illustrates an example of the process of the customer performing an on-line transaction using the single-use payment instrument for an embodiment of the present invention.

FIG. 3 is a flow chart which illustrates an example of the process of the customer 12 performing an on-line transaction using the single-use payment instrument for an embodiment of the present invention. Referring to FIG. 3, at S1, the customer 12 at the customer's PC 10 accesses the vendor's website server 18 over the Internet 22 and chooses to make a purchase from the vendor. At S2, the customer 12 accesses the bank's home banking server 14 and provides transaction details in response to prompts. At S3, the bank's home banking server 14 creates the necessary payment instrument records based on the transaction details and provides the instrument details to the customer 12.

Referring further to FIG. 3 for an embodiment of the present invention, at S4, the customer 12 provides the instrument details to the vendor's website server 18 to make the purchase from the vendor. At S5, the vendor's website server 18 presents the instrument details to its credit card acquirer service 20 for authorization. At S6, the acquirer service 20 presents the details to the bank's credit card authorization server 16 for authorization. At S7, the bank's authorization server 16 verifies the amount, authorizes the transaction and removes the records. At S8, the vendor's acquirer service 20 confirms authorization to the vendor's website server 18 and initiates settlement. At S9, the vendor's website server 18 confirms the purchase to the customer 12 at the customer's PC 10.

Referring again to FIGS. 1 and 2, an important aspect of an embodiment of the present invention is some connection between the vendor's website server 18 and the vendor's card acquirer service 20. When a vendor starts accepting credit cards for payment for goods, the vendor has a relationship, for example, with the vendor's bank, which actually provides the service of getting authorization for card transactions and getting the settlement paid to the vendor's account. Therefore, the vendor has some type of mechanism to pass the card information that the customer 12 sends to the vendor's website server 18 on to the vendor's acquirer service 20. In turn, the acquirer service 20 presents that information to the customer's bank's credit card authorization server 16. In an embodiment of the present invention, the customer's bank's credit card authorization server 16 is also modified per the invention to see a transaction according to the present invention arrive and to authorize the transaction as a perfectly valid credit card transaction.

Various preferred embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the present invention.

What is claimed is:

1. A computer-implemented method for performing an on-line transaction with a vendor using a single-use payment instrument in the absence of a billing service, comprising:

generating by a first computer software application process tangibly embodied in a physical program storage device executable by a physical computer hardware machine and executing on the hardware machine details of a payment instrument for the transaction corresponding to transaction details for the on-line transaction with the vendor received from a customer via a second computer software application process tangibly embodied in a physical program storage device executable by a physical computer hardware machine and executing on the hardware machine, said details of the payment instrument consisting at least in part of a payment amount and a unique identification number for the transaction;

providing the customer by a third computer software application process tangibly embodied in a physical program storage device executable by a physical computer hardware machine and executing on the hardware machine with the payment instrument details for use in the transaction with the vendor; and authorizing the transaction with the vendor for the customer by a fourth computer software application process tangibly embodied in a physical program storage device executable by a physical computer hardware machine and executing on the hardware machine in response to a request for authorization of the transaction for the customer according to the payment instrument details without imposing as a prerequisite for the on-line transaction that the vendor must have entered a billing agreement with a billing service and that the customer must have registered with the billing service.

2. The method of claim 1, wherein generating details of the payment instrument for the transaction corresponding to transaction details for the on-line transaction with the vendor received from a customer further comprises receiving the transaction details for the on-line transaction with the vendor by a home banking server from a computing device of the customer over a network.

3. The method of claim 1, wherein said details of the payment instrument further comprise a fabricated card expiration date.

4. The method of claim 1, wherein providing the customer with the payment instrument details further comprises providing the customer with the payment instrument details by a home banking server coupled to a computing device of the customer over a network.

5. The method of claim 1, wherein authorizing the transaction with the vendor for the customer further comprises authorizing the transaction with the vendor for the customer in response to a request for authorization of the transaction for the customer received by a credit card authorization server.

6. The method of claim 5, wherein authorizing the transaction with the vendor for the customer in response to the request for authorization of the transaction for the customer received by the credit card authorization server further comprises authorizing the transaction with the vendor for the customer in response to the request for authorization of the transaction for the customer received by the credit card authorization server via a credit card acquirer service of the vendor.

7. The method of claim 6, wherein authorizing the transaction with the vendor for the customer in response to the request for authorization of the transaction for the customer received by the credit card authorization server further comprises authorizing the transaction with the vendor for the customer in response to the request for authorization of the transaction for the customer received by the credit card authorization server from a website server of the vendor via a credit card acquirer service of the vendor.

8. The method of claim 1, wherein authorizing the transaction with the vendor further comprises authorizing the transaction if the request for authorization according to the payment instrument details corresponds to a stored record of the payment instrument details.

9. The method of claim 1, wherein authorizing the transaction with the vendor for the customer further comprises authorizing the transaction with the vendor for the customer in response to a request for authorization of the transaction for the customer received by a credit card authorization server before a predefined expiry of the payment instrument.

10. The method of claim 1, further comprising debiting a nominated source of funds for the payment amount.

11. The method of claim 10, wherein debiting the nominated source of funds for the payment amount further comprises receiving the nomination of the source of funds by a home banking server coupled to a computing device of the customer over a network.

12. The method of claim 10, wherein debiting the nominated source of funds for the payment amount further comprises receiving the nomination of the source of funds from among a plurality of nomination options consisting at least in part of a credit card account, a checking account, and a savings account.

13. A computer system for performing an on-line transaction with a vendor using a single-use payment instrument in the absence of a billing service, comprising:

a first computer software application process tangibly embodied in a physical program storage device executable by a physical computer hardware machine and executing on the hardware machine that generates details of a payment instrument for the transaction corresponding to transaction details for the on-line transaction with the vendor received from a customer via a second computer software application process tangibly embodied in a physical program storage device executable by a physical computer hardware machine and executing on the hardware machine, said details of the payment instrument consisting at least in part of a payment amount and a unique identification number for the transaction;

a third computer software application process tangibly embodied in a physical program storage device executable by a physical computer hardware machine and executing on the hardware machine that provides the customer with the payment instrument details for use in the transaction with the vendor; and a fourth computer software application process tangibly embodied in a physical program storage device executable by a physical computer hardware machine and executing on the hardware machine that authorizes the transaction with the vendor for the customer in response to a request for authorization of the transaction for the customer according to the payment instrument details without imposing as a prerequisite for the on-line transaction that the vendor must have entered a billing agreement with a billing service and that the customer must have registered with the billing service.

14. Machine readable medium on which is encoded program code for performing an on-line transaction with a vendor using a single-use payment instrument in the absence of a billing service, comprising instructions that:

generate details of a payment instrument for the transaction corresponding to transaction details for the on-line transaction with the vendor received from a customer, said details of the payment instrument consisting at least in part of a payment amount and a unique identification number for the transaction;

provide the customer with the payment instrument details for use in the transaction with the vendor; and authorize the transaction with the vendor for the customer in response to a request for authorization of the transaction for the customer according to the payment instrument details without imposing as a prerequisite for the on-line transaction that the vendor must have entered a billing agreement with a billing service and that the customer must have registered with the billing service.

15. A computer-implemented method for performing an on-line transaction with a vendor using a single-use payment instrument in the absence of a billing service, comprising:

generating by a first computer software application process tangibly embodied in a physical program storage device executable by a physical computer hardware machine and executing on the hardware machine details of a payment instrument for the transaction specific to the transaction corresponding to the transaction details and consisting at least in part of a payment amount for the transaction and a unique identification number for the transaction embedded with a bank identification number of the customer's bank's credit card authorization server for routing a request for authorization to said customer's bank's credit card authorization server;

providing the customer by a second computer software application process tangibly embodied in a physical program storage device executable by a physical computer hardware machine and executing on the hardware machine with the payment instrument details for use in the transaction with the vendor; and authorizing the transaction with the vendor for the customer by a third computer software application process tangibly embodied in a physical program storage device executable by a physical computer hardware machine and executing on the hardware machine in response to a request for authorization of the transaction for the customer according to the payment instrument details without imposing as a prerequisite for the on-line transaction that the vendor must have entered a billing agreement with a billing service and that the customer must have registered with the billing service.

16. A computer-implemented method for performing an on-line transaction with a vendor using a single-use payment instrument in the absence of a billing service, comprising:

generating by a first computer software application process tangibly embodied in a physical program storage device executable by a physical computer hardware machine and executing on the hardware machine details of a payment instrument for the transaction specific to the transaction corresponding to the transaction details and consisting at least in part of a payment amount for the transaction and a unique identification number for the transaction selected from a characteristic range of numbers identifiable by a web site server of the vendor as an authenticating number;

providing the customer by a second computer software application process tangibly embodied in a physical program storage device executable by a physical computer hardware machine and executing on the hardware machine with the payment instrument details for use in the transaction with the vendor; and authorizing the transaction with the vendor for the customer by a third computer software application process tangibly embodied in a physical program storage device executable by a physical computer hardware machine and executing on the hardware machine in response to a request for authorization of the transaction for the customer according to the payment instrument details without imposing as a prerequisite for the on-line transaction that the vendor must have entered a billing agreement with a billing service and that the customer must have registered with the billing service.

17. A computer-implemented method for performing an on-line transaction using a single-use payment instrument in the absence of a billing service, comprising:

generating by a first computer software application process tangibly embodied in a physical program storage device executable by a physical computer hardware machine and executing on the hardware machine details of a payment instrument for a specific transaction corresponding to the transaction details consisting at least in part of a payment amount for the transaction, a temporary credit card number, and a fabricated card expiration date by a financial institution server processable via a credit card transaction processing system;

providing the customer by a second computer software application process tangibly embodied in a physical program storage device executable by a physical computer hardware machine and executing on the hardware machine with the payment instrument details for use in the transaction with the vendor; and authorizing the transaction with the vendor for the customer by a third computer software application process tangibly embodied in a physical program storage device executable by a physical computer hardware machine and executing on the hardware machine in response to a request for authorization of the transaction for the customer according to the payment instrument details without imposing as a prerequisite for the on-line transaction that the vendor must have entered a billing agreement with a billing service and that the customer must have registered with the billing service.

18. A computer-implemented method for performing an on-line transaction with a vendor using a single-use payment instrument in the absence of a billing service, comprising:

receiving by a website server of the vendor from the customer at a customer computing device details of a payment instrument for the transaction corresponding to transaction details for the on-line transaction with the vendor, said details of the payment instrument consisting at least in part of a payment amount and a unique identification number for the transaction provided to the customer at the customer computing device by a home banking server for use by the customer in the transaction with the vendor;

presenting the payment instrument details by the website server of the vendor to a credit card authorization server via a credit card acquirer service of the vendor for authorization of the transaction for the customer;

receiving authorization by the website server of the vendor from the credit card authorization server via the credit card acquirer service of the vendor for the transaction with the vendor for the customer according to the payment instrument details without imposing as a prerequisite for the on-line transaction that the vendor must have entered a billing agreement with a billing service and that the customer must have registered with the billing service; and providing by the website server of the vendor to the customer at the customer computing device confirmation of payment for the transaction with the vendor according to the payment instrument details.

19. A computer-implemented method for performing an on-line transaction with a vendor using a single-use payment instrument in the absence of a billing service, comprising:

providing by a customer at a customer computing device to a home banking sewer transaction details for the on-line transaction with the vendor consisting at least in part of a payment amount for the transaction with the vendor;

receiving by the customer at the customer computing device from the home banking sewer details of a payment instrument generated by the home banking sewer for use in the transaction with the vendor corresponding to the transaction details, said payment instrument details consisting at least in part of the payment amount and a unique identification number for the transaction;

providing the payment instrument details by the customer at the customer computing device to the website server of the vendor; and receiving authorization by the website server via the credit card acquirer service of the vendor for the transaction with the vendor for the customer according to the payment instrument details without imposing as a prerequisite for the on-line transaction that the vendor must have entered a billing agreement with a billing service and that the customer must have registered with the billing service.

* * * * *

UNITED STATES PATENT AND TRADEMARK OFFICE
CERTIFICATE OF CORRECTION

PATENT NO. : 7,606,770 B2  
APPLICATION NO. : 12/153876  
DATED : October 20, 2009  
INVENTOR(S) : Nigel Pinnell It is certified that error appears in the above-identified patent and that said Letters Patent is hereby corrected as shown below:

In Column 12, Line 22, please change "a home banking sewer transaction details for the on-line" to -- a home banking server transaction details for the on-line --

In Column 12, Line 26, please change "device from the home banking sewer details of a pay-" to -- device from the home banking server details of a pay- --

In Column 12, Line 27, please change "ment instrument generated by the home banking sewer" to -- ment instrument generated by the home banking server --

Signed and Sealed this

Sixth Day of April, 2010

David J. Kappos
*Director of the United States Patent and Trademark Office*